United States Patent Office 2,852,100
Patented Sept. 16, 1958

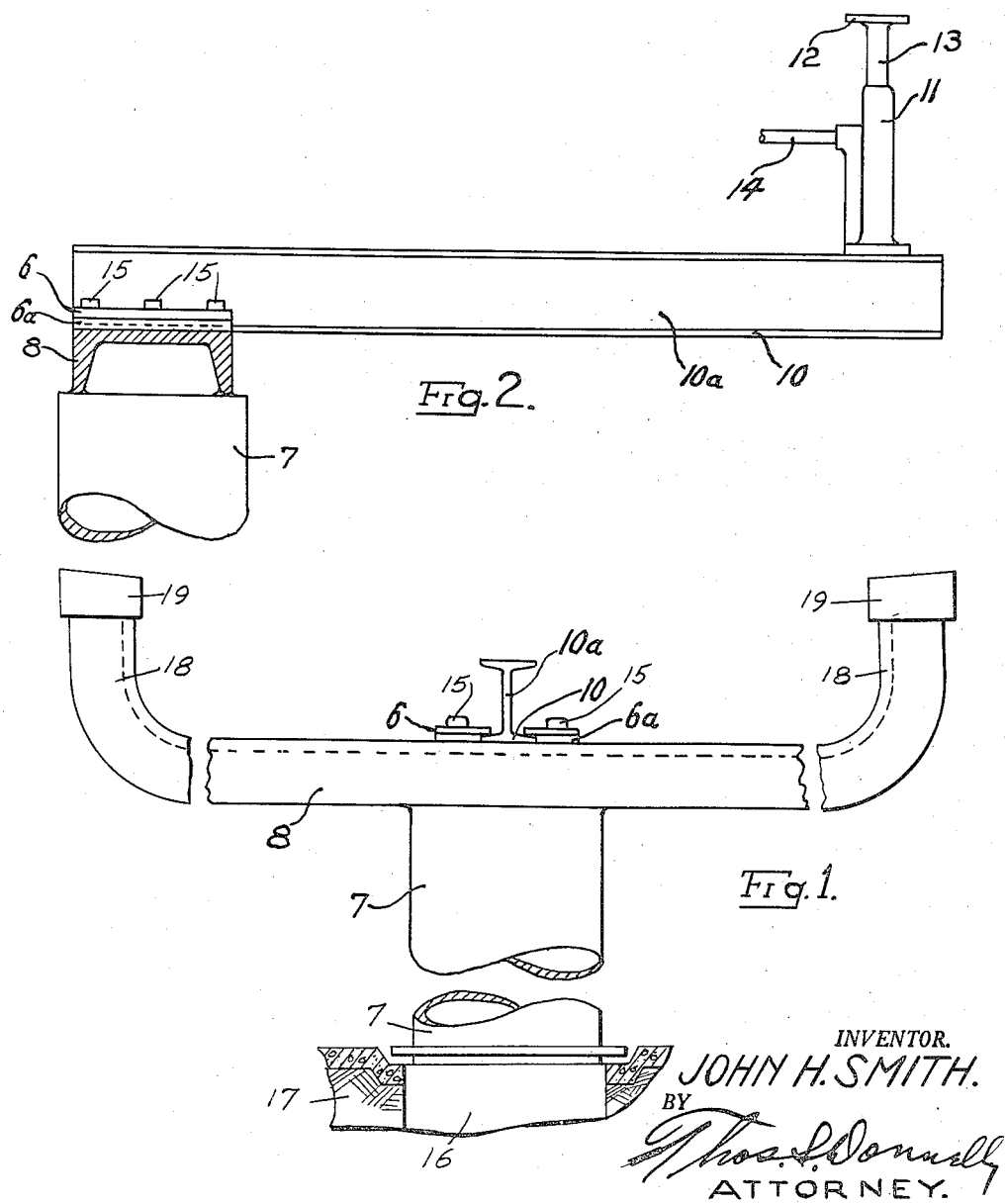

2,852,100
JACKING MECHANISM
John H. Smith, Allen Park, Mich.
Application July 29, 1953, Serial No. 370,938
1 Claim. (Cl. 187—8.43)

My invention relates to a new and useful improvement in a jacking mechanism adapted for use on a hoist used for elevating automobiles so that the operator may have access to the underside of the automobile and be able to make repairs and adjustments with ease.

When the automobile is brought into a service station and elevated by the hoist the automobile is usually engaged by supporting rails engaging all four wheels. These rails are connected by cross-bars. In some instances the ram of the hoisting mechanism is provided with a mechanism resembling a cross-head and corresponding largely to the connecting bars of the spaced-apart rails. After the automobile has been raised by the hoist it sometimes becomes necessary to elevate the automobile relatively to the hoist in order, for instance, to remove or replace a wheel or remove or replace parts of the engine block.

It is an object of the present invention to provide a jacking mechanism mounted on an elevating mechanism in such a manner that this jacking mechanism will not interfere with the normal function of the elevating mechanism and may at the same time be moved relatively to the mechanism to engage the automobile at various parts and to provide a means for raising such parts relatively to the elevating mechanism.

It is another object of the present invention to provide a slideable beam mounted on the hoisting mechanism and provided with a jack so that the jack may be brought into registration with various parts of the automobile and moved to various positions relative to the hoisting position.

Another object of the present invention is to provide in association with the hoisting mechanism a jacking mechanism so that the entire structure will be durable, economical of manufacture and simple and easy to operate.

Other objects will appear hereinafter.

It is recognized that various modifications and changes may be made in the detail of structure illustrated and it is intended that the present disclosure shall be considered to be but the preferred embodiment.

Forming a part of this application are drawings in which,

Fig. 1 is a fragmentary view illustrating the beam in end elevation;

Fig. 2 is a fragmentary elevational view of the invention.

In the drawings I have shown a conventional hoisting mechanism which includes elevating ram 7 secured to which is the cross-head 8 which is provided with the usual upwardly extending arms 18 on the outer ends thereof. The arms 18 are provided with the usual pads 19 which engage the automobile at spaced apart points either under the front springs or rear springs thereof. This ram 7 is operatively mounted in the usual supporting cylinder 16 in the floor 17 and may be moved upwardly and downwardly by any suitable means of power, the power generally used being hydraulic. Mounted on the cross-head 8 are plates 6 which are spaced from the cross-head 8 by the narrower plates 6A so that there is thus provided a track forming mechanism including a pair of spaced-apart guides in which the web 10 of an I-beam 10A may engage so that the I-beam is thus moveable longitudinally relatively to the cross-head. The I-beam is adapted to be secured in any adjusted position by means of the bolts 15 which are adapted to pass through the plates 6 and 6a and be threadably mounted in the cross-head 8. Mounted at any suitable desired location on the I-beam 10A is a jack 11 having the engagement plate 12 on the end of the piston 13. The jack is designed to be operated by the handle 14. With this construction the I-beam may be moved to various positions relatively to the cross-head 8 so that various parts of the automobile which are supported on the cross-head 8 may be engaged by the jacking mechanism and elevated relatively to the cross-head.

Experience has shown that with a structure of this type considerable saving of labor is effected in the repairing the adjusting of automobiles.

What I claim is:

In a device of the class described, a hoisting mechanism comprising: an elevating ram provided with a fixedly mounted cross-head on the upper end thereof; a first pair of laterally spaced plates on the upper side of said cross-head; an I-beam having one end thereof slidably mounted on said cross-head, between said first pair of plates, with the longitudinal axis thereof being disposed at right angles to the longitudinal axis of said cross-head; a second pair of laterally spaced plates; each of said second pair of laterally spaced plates being disposed on top of one of said first pair of laterally spaced plates and having the inner edges thereof extending over and engaging the lower web on the I-beam; a plurality of bolts releasably securing said plates on said cross-head, whereby, a clamping force is exerted on the lower web of the I-beam to releasably secure it on the cross-head; and, a jacking mechanism fixedly mounted on the other end of the I-beam on the upper web thereof.

References Cited in the file of this patent

UNITED STATES PATENTS

| | | |
|---|---|---|
| 1,573,918 | Dewhirst | Feb. 23, 1926 |
| 1,847,719 | Hirschel | Mar. 1, 1932 |
| 2,540,428 | Cochin | Feb. 6, 1951 |
| 2,593,635 | Walker | Apr. 22, 1952 |

FOREIGN PATENTS

| | | |
|---|---|---|
| 447,591 | Great Britain | May 21, 1936 |